F. W. DOBBEL.
EGG TESTER.
APPLICATION FILED MAY 28, 1914.
1,144,466.
Patented June 29, 1915.
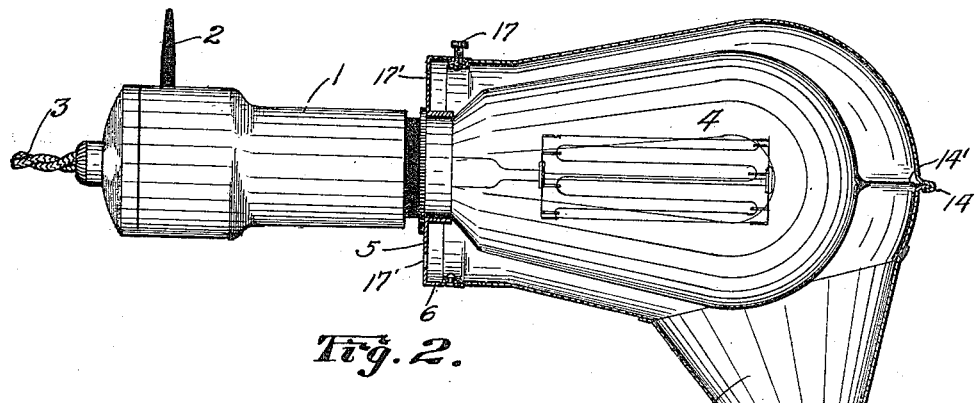
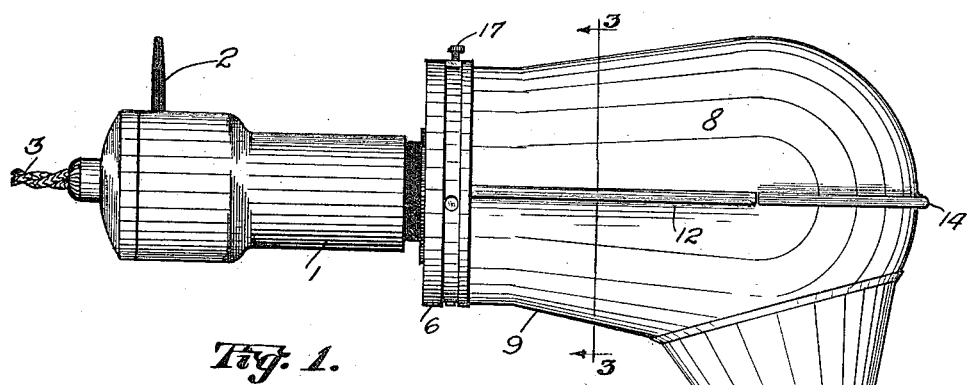
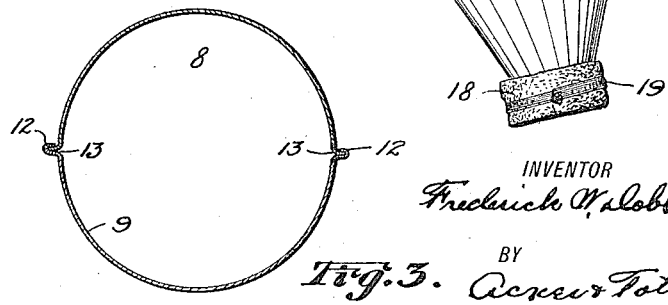
WITNESSES:
INVENTOR
Frederick W. Dobbel
BY
Acker & Potter
ATTORNEYS
THE NORRIS PETERS CO., PHOTO LITHO., WASHINGTON, D. C.

UNITED STATES PATENT OFFICE.

FREDERICK W. DOBBEL, OF SONOMA, CALIFORNIA.

EGG-TESTER.

1,144,466.   Specification of Letters Patent.   Patented June 29, 1915.

Application filed May 28, 1914. Serial No. 841,563.

*To all whom it may concern:*

Be it known that I, FREDERICK W. DOBBEL, a citizen of the United States, residing at Sonoma, in the county of Sonoma and State of California, have invented certain new and useful Improvements in Egg-Testers, of which the following is a specification.

The present invention relates to improvements in egg testers adapted for testing the eggs during incubation, and without removing the eggs or handling the same.

At present, egg testers are employed which are of the fuel oil lamp type having a dark shade provided with an opening in its side wall and to which opening the eggs are placed, the light of the lamp penetrating the shell of the egg and by keeping the room dark, the fertility of the egg may be readily determined. This method necessitates the removing of each egg from the tray, necessitates the handling and jarring of each egg, and requires considerable time to test each egg, making the operation of testing the eggs contained in an incubator a long and tedious one.

My present invention has for its principal objects to provide a portable egg tester, that is, one which is moved from egg to egg without the necessity of disturbing the eggs in their resting place, if it is not necessary; one by which the eggs may be readily and rapidly tested in their trays, and one which is particularly adapted for the testing of eggs while the same are lying on the egg tray of an incubator.

The invention consists broadly in a housing or shade provided with an elongated part formed with an opening in its end and said housing containing a suitable illuminating means preferably an electric lamp connected to a source of supply and for projecting rays through said opening to penetrate the egg shell when the elongated end of said housing is in contact therewith.

With the above mentioned and other objects in view, the invention consists in the novel combination and construction of parts hereinafter described, illustrated in the accompanying drawings and pointed out in the claims hereto appended; it being understood that various changes in the form, proportion, size and minor details of construction within the scope of the appended claims may be resorted to without departing from the spirit or sacrificing any of the advantages of the invention.

To more fully comprehend the invention, reference is directed to the accompanying sheet of drawings illustrating the preferred form of my invention, and in which—

Figure 1 is a view in side elevation of my invention, disclosing the lamp socket forming the handle, the housing and the elongated portion of the housing open at its lower end. Fig. 2 is a longitudinal sectional view of the housing, disclosing the lamp, the manner of mounting the housing on the lamp socket, and the elongated portion open at its lower end. Fig. 3 is a sectional view of the housing taken on line 3—3 of Fig. 1. Fig. 4 is a view in detail of the manner of mounting one section of the housing on the supporting bracket.

Referring more particularly to the drawings wherein like characters of reference designate corresponding parts throughout the several views, the numeral 1 is a suitable electric socket of any well known type, elongated to form a suitable hand grip and preferably containing a switch operated by the button 2 which controls the current passing through the socket from the feed wires 3, which receive their power from any suitable source, not shown.

Removably mounted in one end of the socket 1 is a suitable electric lamp 4 and mounted on the end of the socket at the base of the lamp is a suitable circular supporting bracket 5 formed with the annular flange 6 which is formed in its surface with an annular depression 7 provided at intervals with suitable openings. The lamp is inclosed by a suitable housing of substantially the same general configuration of the lamp and of a size slightly larger than the same, and said housing is divided longitudinally into the upper removable and lower stationary sections 8 and 9. The trough shaped section 9 adjacent its outer end is formed with a cylindrical tapering chamber 10 communicating at its large end with the interior of said shade and open at its lower end, as at 11, and said chamber provides a means for the projection of the light rays from the housing and the opening at the lower end thereof is adapted to be positioned into engagement with the egg shell preferably at the air pocket in the large oval end thereof, and the rays of light penetrating the shell will enable one to readily determine the fertility of the egg.

One portion of the upper side edges of the lower section 9 is bent inwardly as at 12 to provide suitable grooves for the reception of the outwardly bent side flanges 13 of the side edges of the upper section 8. The forward curved edge of the upper section 8 is bent over as at 14' forming a groove in which is received the outwardly projecting flange 14 formed on the forward curved edge of the lower section 9, thus it will be observed that when the sections are assembled a tight interlocking joint is maintained between the same.

The inner ends of the sections when assembled are approximately the same diameter and configuration as the interior of the bracket 5, and the same are formed with an inwardly bent flanged portion 15 which limits the insertion of the sections within the bracket, and said flanged portion is provided with suitable apertures adapted to register with the apertures in the supporting bracket.

The section 9 is preferably attached to the supporting bracket by means of suitable bolts or other fastenings 16 which are inserted through the alined apertures. The upper removable section is retained in position by a suitable thumb screw 17 which enables the upper section to be quickly detached from the bracket and by moving the same forwardly relative to the lower section, the two may be readily separated. When the top section is removed access may be readily obtained to the lamp either for examination or removal from its socket.

The supporting bracket 5 is preferably provided with a plurality of openings 17' in its rear wall for the escape of the heat from the interior of the housing or shade.

The interior of the sections 8 and 9 are preferably coated with some highly reflecting material and the outlet opening carries a suitable pad or protecting covering 18 secured thereover in any suitable manner, preferably by the binding cord 19, the pad extending beyond the end of the material, thus preventing the material from contacting with the egg shell and also providing a tight joint when the tester is in use on the eggs.

In an incubator, the eggs for hatching are arranged in rows in the trays and with the large ends all in one direction for convenience in testing. When it is time for testing the eggs, the operator with my improved apparatus need only draw the tray from within the incubator, exclude the light from around the incubator, turn the switch to permit the lamp to be lighted, and then place the opening 11 on the large end of each egg, where the air cell is located, and the light rays from the opening will penetrate the egg shell and enable the operator to observe whether or not the germ in the egg is alive. If necessary each egg after being examined may be turned, but it is to be understood that by the use of my improved apparatus it is not necessary to remove each egg from the tray.

Having thus described my invention what I claim and desire to protect by Letters Patent is:—

1. In an egg tester, the combination with an electric lamp and socket therefor, a flexible connection between said socket and a source of electric supply, a shade inclosing the lamp and detachably connected to said socket and divided into sections longitudinally, one of said sections being provided with a downwardly projected funnel, said extension communicating at its large end with the interior of the said shade and open at its smaller end to the atmosphere, and a protecting strip mounted on said open end of the extension for protecting the eggs to be tested against breakage by contact of the tester therewith.

2. In an egg tester the combination with an electric lamp and socket therefor, of a supporting bracket carried by said socket, a shade inclosing said lamp and connected to said supporting bracket and divided into sections longitudinally, one of said sections being formed with an outwardly projecting funnel shaped portion communicating at its large end with the interior of said shade and open at its outer end for directing rays of light onto the eggs to be tested.

3. In an egg tester the combination with an electric lamp and socket therefor, of a supporting bracket carried by said socket, a shade inclosing said lamp and connected to said supporting bracket, said shade divided longitudinally into a plurality of detachable sections having interlocking edges, and said shade provided with an opening therein for directing rays of light onto the eggs to be tested.

4. In an egg tester the combination with an electric lamp and socket therefor, of a supporting bracket carried by said socket, a shade inclosing said lamp, said shade divided longitudinally into a plurality of detachable sections, means for detachably securing each of said sections to said bracket and one of said sections formed with an opening therein for directing the rays of light onto the eggs to be tested.

5. In an egg tester the combination with an electric lamp and socket therefor, of a supporting bracket carried by said socket, a shade inclosing said lamp, said shade divided longitudinally into a plurality of detachable sections, means for detachably securing each of said sections to said bracket, one of said sections formed with an opening therein and a protector surrounding the edges of said opening.

6. In an egg tester the combination with an electric lamp and socket therefor, of a supporting bracket carried by said socket, a shade inclosing said lamp, said shade divided longitudinally into a plurality of detachable sections having interlocking edges, means for detachably securing each of said sections to said bracket, one of said sections formed with a funnel shaped projection communicating at its large end with the interior of said shade and open at its small end, and a protector carried by said projection and extending beyond the edges of the opening at said smaller end.

7. A portable egg tester, the combination with a socket provided with a controlling switch, of an electric lamp secured to said socket, a flexible connection between the socket and a source of electric supply, a shade or housing for inclosing said lamp, said shade divided longitudinally into a plurality of sections, means for detachably securing said sections together, means for detachably connecting the shade sections to the lamp socket, and an open ended extension downwardly projected from one of the sections of said shade and communicating with the interior thereof, the said extension directing the rays of light onto the article to be tested.

In testimony whereof I have signed my name to this specification in the presence of two subscribing witnesses.

FREDERICK W. DOBBEL.

Witnesses:
R. J. DAUNEMARK,
E. J. LUDTKE.

Copies of this patent may be obtained for five cents each, by addressing the "Commissioner of Patents, Washington, D. C."